12) United States Patent
Stojanovski et al.

(10) Patent No.: US 10,567,581 B2
(45) Date of Patent: Feb. 18, 2020

(54) IMS EMERGENCY CALL ROUTING TECHNIQUES

(71) Applicant: INTEL IP CORPORATION, Santa Clara, CA (US)

(72) Inventors: Alexandre Saso Stojanovski, Paris (FR); Frederick Joly, Aspremont (FR); Jerome Parron, Feurth (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/750,825

(22) PCT Filed: Dec. 22, 2015

(86) PCT No.: PCT/US2015/067357
§ 371 (c)(1),
(2) Date: Feb. 6, 2018

(87) PCT Pub. No.: WO2017/027058
PCT Pub. Date: Feb. 16, 2017

(65) Prior Publication Data
US 2018/0227419 A1 Aug. 9, 2018

Related U.S. Application Data

(60) Provisional application No. 62/202,634, filed on Aug. 7, 2015.

(51) Int. Cl.
H04W 76/00 (2018.01)
H04M 3/51 (2006.01)
H04L 29/06 (2006.01)

(52) U.S. Cl.
CPC ......... H04M 3/5116 (2013.01); H04L 65/105 (2013.01); H04L 65/1006 (2013.01); H04L 65/1016 (2013.01); H04L 65/1069 (2013.01)

(58) Field of Classification Search
None
See application file for complete search history.

(56) References Cited

U.S. PATENT DOCUMENTS

2009/0310758 A1   12/2009  Tuohino et al.
2017/0331691 A1*  11/2017  Zhou ....................... H04L 69/08
2018/0063688 A1*  3/2018   Lindholm ............... H04W 4/90

FOREIGN PATENT DOCUMENTS

WO    2013151484 A1   10/2013

OTHER PUBLICATIONS

International Search Report and Written Opinion, dated Jun. 13, 2016, Application No. PCT/US2015/067357, Filed Date: Dec. 22, 2015, pp. 5.

* cited by examiner

Primary Examiner — Suhail Khan
(74) Attorney, Agent, or Firm — Eschweiler & Potashnik, LLC

(57) ABSTRACT

IMS emergency call routing techniques are described. In one embodiment, for example, an apparatus may comprise at least one memory and logic for a P-CSCF node, at least a portion of the logic comprised in circuitry coupled to the at least one memory, the logic to cause the P-CSCF node to receive an SIP INVITE message from a roaming UE, the SIP INVITE message associated with an attempt to place an emergency call via an unauthenticated IMS session, the logic to cause the P-CSCF node to obtain a PSAP callback number for the UE from a PCRF node via an Rx interface, identify a PSAP callback parameter for the UE based on the PSAP callback number, insert the PSAP callback parameter into the SIP INVITE message, and forward the SIP INVITE message to a PSAP. Other embodiments are described and claimed.

24 Claims, 12 Drawing Sheets

300

IMS EMERGENCY CALL ROUTING TECHNIQUES

RELATED CASE

This application is a national stage application claiming the benefit of and priority to International Application No. PCT/US2015/067357 entitled "IMS EMERGENCY CALL ROUTING TECHNIQUES" filed Dec. 22, 2015, which claims priority to U.S. Provisional Patent Application No. 62/202,634, filed Aug. 7, 2015, both of which are incorporated herein by reference in their entirety.

TECHNICAL FIELD

Embodiments herein generally relate to communications between devices in broadband wireless communications networks.

BACKGROUND

According to an S8HR roaming architecture for internet protocol multimedia subsystem (IMS) call support, an ordinary IMS call of user equipment (UE) that is roaming within a visited public land mobile network (VPLMN) may be routed through a packet data network gateway (PGW) and proxy call session control function (P-CSCF) node that are both located within a home public land mobile network (HPLMN) of the UE. However, an IMS emergency call of the UE may need to be routed through a PGW and P-CSCF node that are both located within the VPLMN, so that the IMS emergency call will be placed with a public safety answering point (PSAP) that is located within relatively close proximity to the UE. If no session initiation protocol (SIP)-based network-to-network interface (NNI) exists between the VPLMN and the HPLMN, the P-CSCF node that handles the IMS emergency call in the VPLMN may be unable to directly communicate with a home subscriber services (HSS) node in the HPLMN.

DETAILED DESCRIPTION

Figure 1:
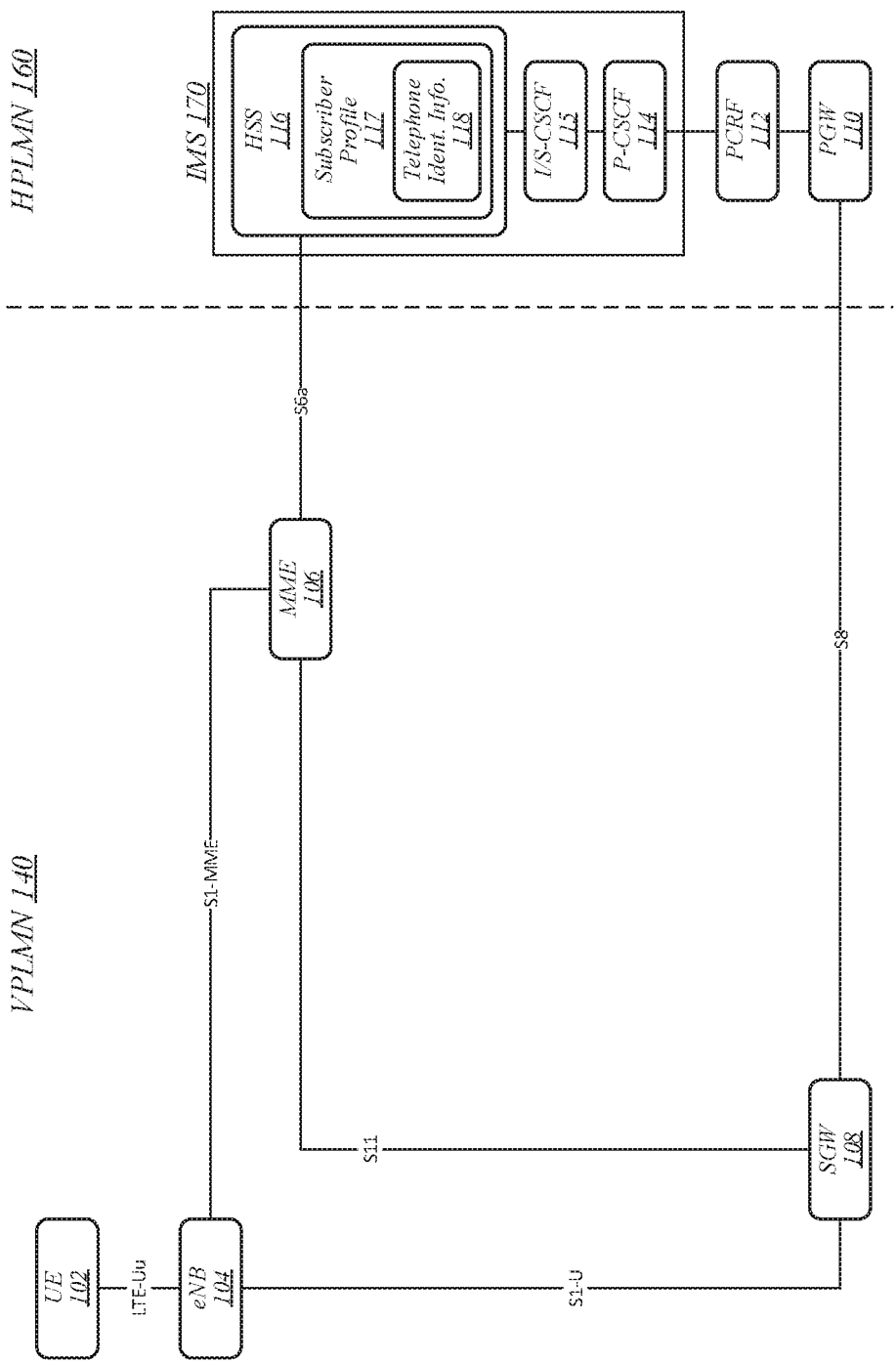
FIG. 1 illustrates an embodiment of a first operating environment.

Various embodiments may be generally directed to IMS emergency call routing techniques. In one embodiment, for example, an apparatus may comprise at least one memory and logic for a P-CSCF node, at least a portion of the logic comprised in circuitry coupled to the at least one memory, the logic to cause the P-CSCF node to receive an SIP INVITE message from a roaming UE, the SIP INVITE message associated with an attempt to place an emergency call via an unauthenticated IMS session, the logic to cause the P-CSCF node to obtain a PSAP callback number for the UE from a PCRF node via an Rx interface, identify a PSAP callback parameter for the UE based on the PSAP callback number, insert the PSAP callback parameter into the SIP INVITE message, and forward the SIP INVITE message to a PSAP. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LIE), and/or 3GPP LIE-Advanced (LIE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies m and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. More particularly, operating environment 100 may be representative of some embodiments in which voice over LTE (VoLTE) support for roaming user equipment in a public land mobile network (PLMN) is generally provided according to an S8 home routed (S8HR) roaming architecture for internet protocol (IP) multimedia subsystem (IMS) calls. In operating environment 100, user equipment WE) 102 roams within a visited PLMN (VPLMN) 140. In various embodiments, while roaming within VPLMN 140, UE 102 may establish wireless connectivity with an evolved node B (eNB) 104 within VPLMN 140. In some embodiments, UE 102 and eNB 104 may be configured to communicate with each other via an LTE-Uu interface. In various embodiments, eNB 104 and a mobility management entity (MME) 106 of VPLMN 140 may be configured to communicate with each other via an S1-MME interface. In some embodiments, eNB 104 and a serving gateway (SGW) 108 of VPLMN 140 may be configured to communicate with each other via an S1-U interface. In various embodiments, MME 106 and SGW 108 may be configured to communicate with each other via an S11 interface. The embodiments are not limited in this context.

In some embodiments, if UE 102 places an ordinary IMS call, that call may be handled by an IMS 170 within a home PLMN (HPLMN) 160 of UE 102. More particularly, in various embodiments, that call may be routed to a proxy call session control function (P-CSCF) 114 in IMS 170 via a packet data network (PDN) gateway (PGW) 110 and policy and charging rules function (PCRF) 112 of HPLMN 160. In some embodiments, in IMS 170, P-CSCF 114 may be configured to communicate with n serving call session control function (S-CSCF) and interrogating call session control function (I-CSCF), which are collectively depicted in FIG. 1 as I/S-CSCF 115. In various embodiments, I/S-CSCF 115 may be configured to communicate with home subscriber services (HSS) 116. In some embodiments, MME 106 may be configured to communicate with HSS 116 via an S6a interface. The embodiments are not limited in this context.

In various embodiments, following initiation of an ordinary IMS call that is routed to IMS 170, UE 102 may engage in an IMS registration procedure. In some embodiments, during the IMS registration procedure, IMS 170 may authenticate UE 102. In various embodiments, in order to authenticate UE 102, IMS 170 may need to identify one or more subscriber parameters associated with UE 102. In some embodiments, IMS 170 may identify one or more such subscriber parameters by accessing a subscriber profile 117 for UE 102 that is stored at HSS 116. In various embodiments, the information contained in subscriber profile 117 may include telephone identification information 118 associated with UE 102. In some embodiments, telephone identification information 118 may generally comprise information indicating an identity associated with UE 102 for the purpose of telephonic/voice communications. For example, in various embodiments, telephone identification information 118 may comprise a telephone uniform resource identifier (TEL URI) associated with UE 102. It is worthy of note that in some embodiments, IMS 170 may include one or more nodes that are not depicted in FIG. 1, and the embodiments are not limited to this example.

Figure 2:
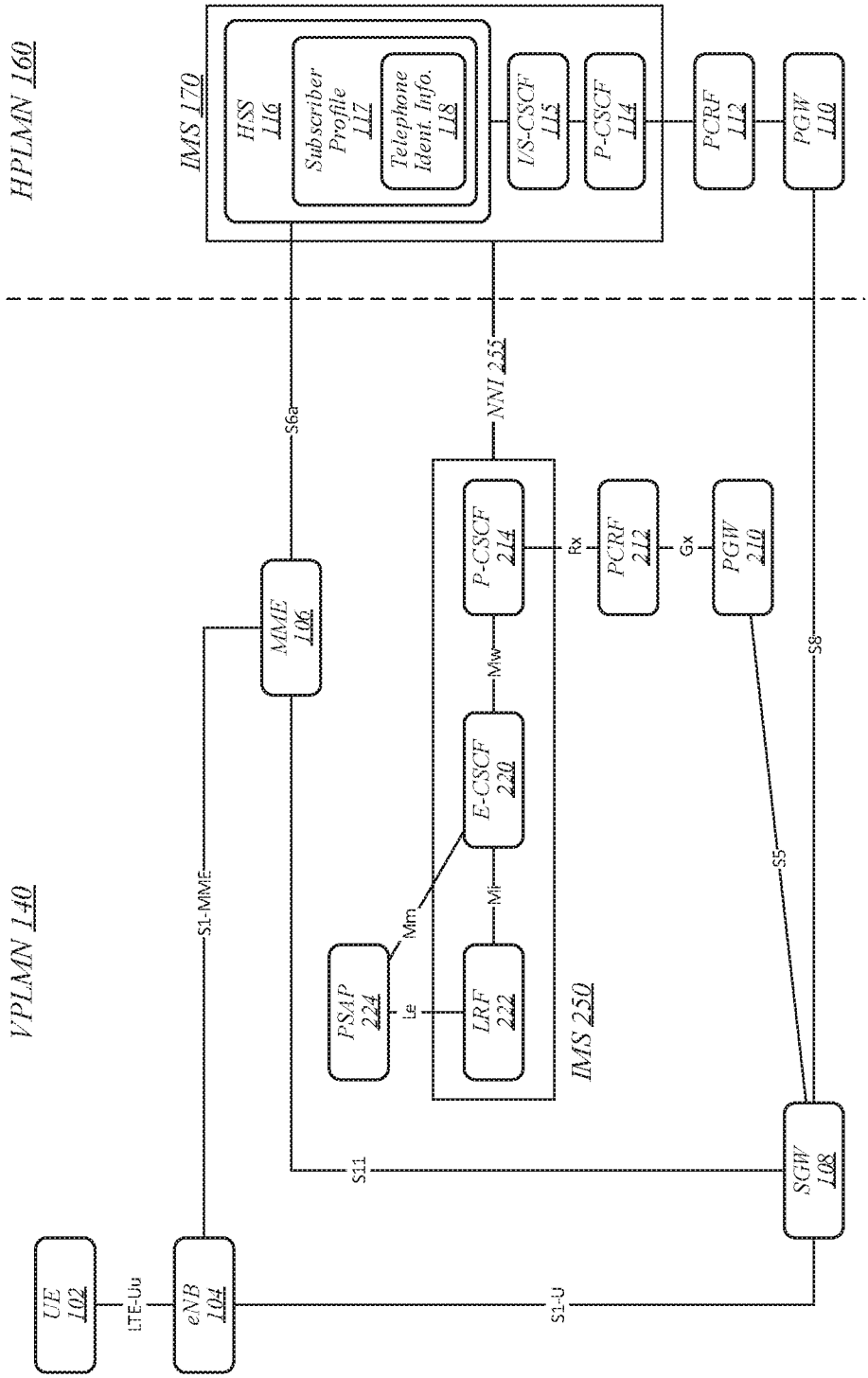
FIG. 2 illustrates an embodiment of a second operating environment.

FIG. 2 illustrates an example of an operating environment 200 that may be representative of various embodiments. In operating environment 200, while roaming within the same VPLMN 140 as is depicted in FIG. 1, UE 102 may place an IMS emergency call. In some embodiments, routing the IMS emergency call to IMS 170 in HPLMN 160 may result in the IMS emergency call being routed to a public safety answering point (PSAP) in HPLMN 160. In various embodiments, this PSAP may generally only be able to dispatch emergency services/personnel located in its general vicinity within HPLMN 160. As such, in some embodiments, since UE 102 is not located within HPLMN 160, it may be desirable that the IMS emergency call be handled by an IMS 250 in VPLMN 140. In various embodiments, the IMS emergency call of UE 102 may be routed to a P-CSCF 214 in IMS 250 via a PGW 210 and PCRF 212 of VPLMN 140. In some embodiments, SGW 108 and PGW 210 may be configured to communicate with each other via an S5 interface. In various embodiments, PGW 210 and PCRF 212 may be configured to communicate with each other via a Gx interface. In some embodiments, PCRF 212 and P-CSCF 214 may be configured to communicate with each other via an Rx interface.

In various embodiments, in IMS 250, P-CSCF 214 may be configured to communicate with an emergency call session control function (E-CSCF) 220. In some embodiments, P-CSCF 114 and E-CSCF 220 may be configured to communicate with each other via an Mw interface. In various embodiments, E-CSCF 220 may select a PSAP 224 to which to route the IMS emergency call of UE 102. In some embodiments, E-CSCF 220 may be configured to communicate with a location retrieval function (LRF) 222 to obtain information regarding the location of UE 102, and may select PSAP 224 based at least in part on such information. In various embodiments, PSAP 224 may comprise a PSAP that is located within relatively close proximity to UE 102, such that emergency services/personnel that it may dispatch are able to reach the location of UE 102 relatively quickly. In some embodiments, E-CSCF 220 and LRF 222 may be configured to communicate with each other via an Mi interface. In various embodiments. E-CSCF 220 and PSAP 224 may be configured to communicate with each other via an Mm interface. In some embodiments, LRF 222 and PSAP 224 may be configured to communicate with each other via an Le interface. It is worthy of note that in various embodiments, IMS 250 may include one or more nodes that are not depicted in FIG. 2, and the embodiments are not limited to this example.

In some embodiments, following initiation of an IMS emergency call that is routed to IMS 250, UE 102 may engage in an emergency IMS registration procedure. In various embodiments, during the emergency EMS registration procedure, IMS 250 may attempt to authenticate UE 102. In some embodiments, in order to authenticate UE 102, IMS 250 may need to identify one or more subscriber parameters associated with UE 102. As shown in FIG. 2, in operating environment 200, a network-to-network interface (NNI) 255 may be configured that generally enables communications between the IMS 250 of VPLMN 140 and the IMS 170 of HPLMN 160. In various embodiments, NNI 255 may comprise an Mx interface. In some embodiments, P-CSCF 214 may be configured to communicate with I/S-CSCF 115 via NNI 255. In various embodiments, IMS 250 may use the connectivity provided by NNI 255 to identify one or more subscriber parameters associated with UE 102, by accessing the subscriber profile 117 for UE 102 that is stored at HSS 116.

In some embodiments, it may be desirable that PSAP 224 be provided with information enabling emergency dispatchers/personnel to call UE 102 back following completion/termination of the initial IMS emergency call. In various embodiments, IMS 250 may therefore provide PSAP 224 with a callback number via which UE 102 can be reached. In some embodiments, IMS 250 may be provided with the telephone identification information 118 associated with UE 102 during the emergency IMS registration procedure, and may identify the callback number for UE 102 based on that telephone identification information 118. In various embodiments, IMS 250 may provide the callback number to PSAP 224 in the form of a callback parameter included within a session initiation protocol (SIP) message that it directs to PSAP 224 in conjunction with routing the IMS emergency call to PSAP 224. The embodiments are not limited in this context.

Figure 3:
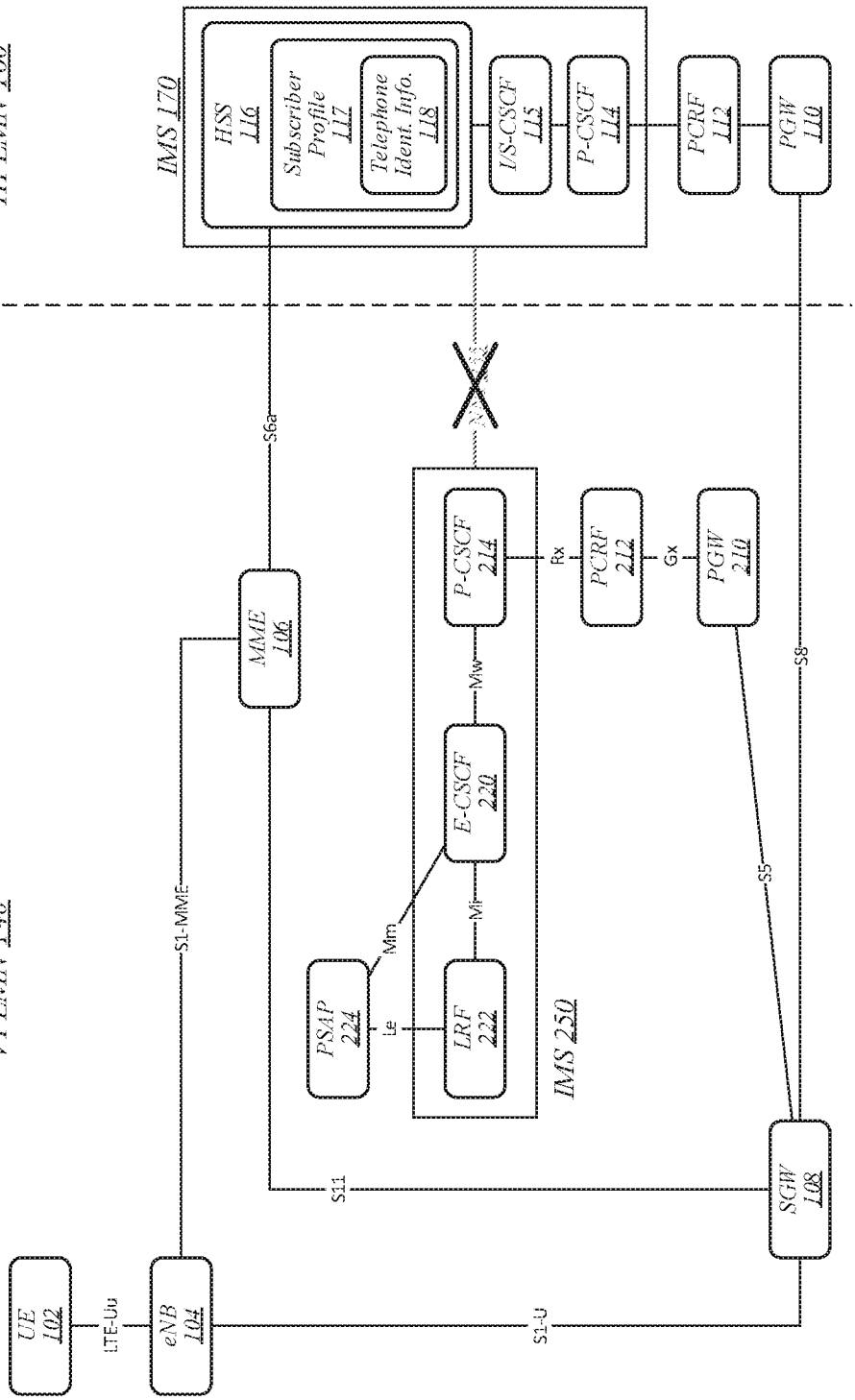
FIG. 3 illustrates an embodiment of a third operating environment.

FIG. 3 illustrates an example of an operating environment 300 that may be representative of some embodiments. In operating environment 300, as in operating environment 200 of FIG. 2, an IMS emergency call of UE 102 may be routed to IMS 250 in VPLMN 140 via PGW 210 and PCRF 212, and UE 102 may engage in an emergency IMS registration procedure. However, in operating environment 300, there may be no NNI 255 configured to enable communications between IMS 250 and IMS 170. In various embodiments, in the absence of NNI 255, IMS 250 may have no way of communicating with IMS 170. As a result, the emergency IMS registration procedure may fail, without IMS 250 having been provided with the telephone identification information 118 associated with UE 102. In some embodiments, UE 102 may still be able to place its IMS emergency call by establishing an unauthenticated IMS emergency session. However, in various such embodiments, having not been provided with telephone identification information 118, IMS 250 may be unable to provide the callback number for UE 102 to PSAP 224 in conjunction with routing the IMS emergency call to PSAP 224. As a result, in some embodiments, emergency dispatchers/personnel may be unable to call UE 102 back following completion/termination of the initial IMS emergency call.

Disclosed herein are emergency call routing techniques such as may be implemented in various embodiments in order to enable callback numbers to be provided to PSAPs such as PSAP 224 under circumstances such as those of operating environment 300. According to some such techniques, following receipt of an emergency PDN connection request message from a UE, an MME in a VPLMN of the UE may communicate with an HSS in an HPLMN of the UE in order to obtain telephone identification information comprised in a subscriber profile for the UE. In various embodiments, the MME may then include the telephone identification information in a session creation request message that it sends towards a PGW in the VPLMN in conjunction with the establishment of a PDN connection via which the UE may route an IMS emergency call. In some embodiments, the PGW may pass the telephone identification information to a PCRF of the VPLMN, and the PCRF may in turn pass the telephone identification information to a P-CSCF of an IMS of the VPLMN. In various embodiments, the P-CSCF may determine a callback parameter based on the telephone identification information, and may then include the callback parameter in a message that it directs to the PSAP in conjunction with routing the IMS emergency call to the PSAP. The embodiments are not limited in this context.

Figure 4:
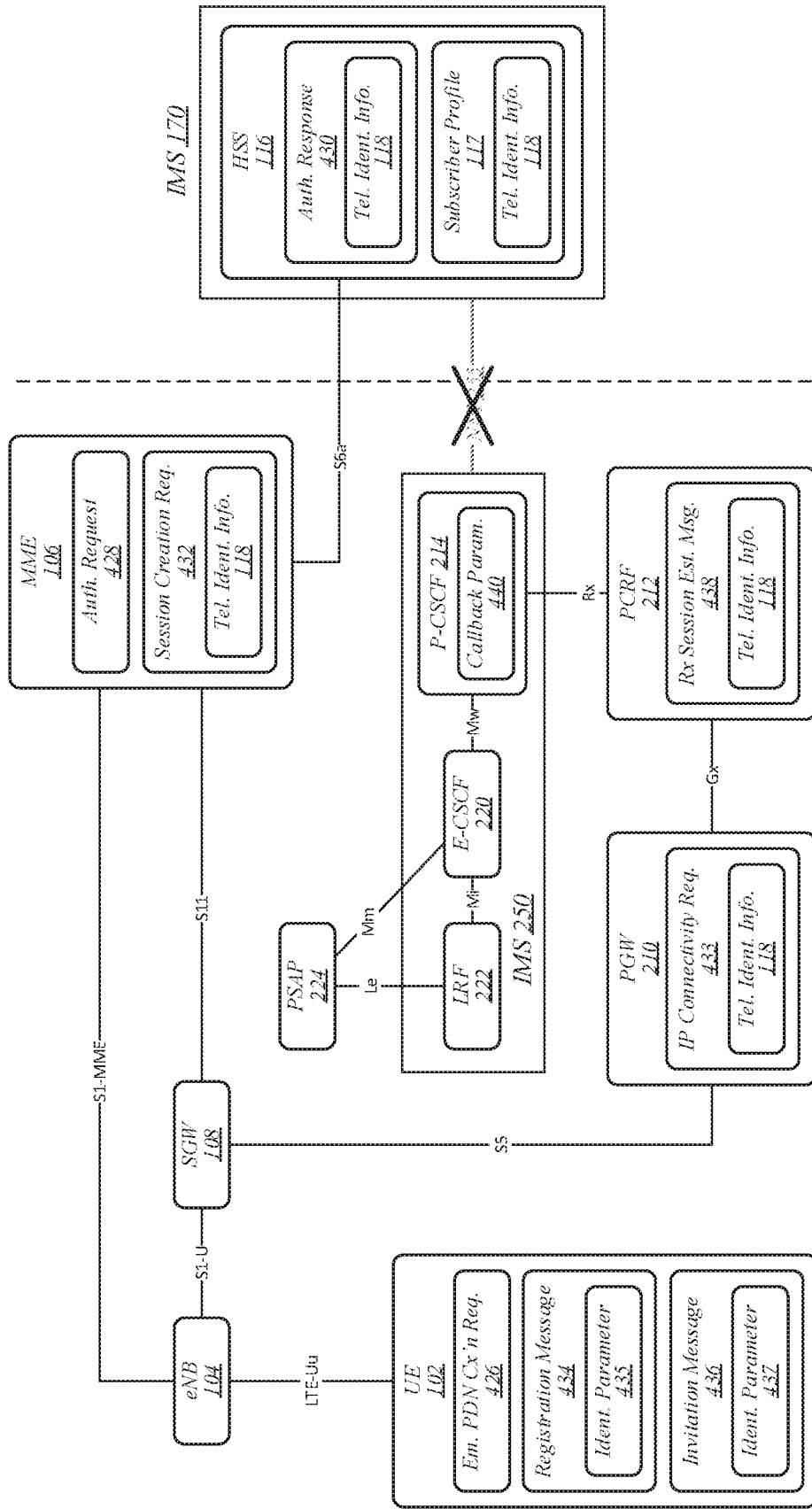
FIG. 4 illustrates an embodiment of a fourth operating environment.

FIG. 4 illustrates an example of an operating environment 400 that may be representative of the implementation of one or more of the disclosed emergency call routing techniques according to some embodiments. In operating environment 400, in conjunction with initiating an IMS emergency call while roaming in VPLMN 140, UE 102 may send an emergency PDN connection request 426 to MME 106. In various embodiments, emergency PDN connection request 426 may comprise an ATTACH REQUEST message or a PDN CONNECTIVITY REQUEST message. In some embodiments, emergency PDN connection request 426 may comprise an emergency indicator to indicate that emergency PDN connection request 426 comprises a request for establishment of a PDN connection for emergency purposes. The embodiments are not limited in this context.

In various embodiments, following receipt of emergency PDN connection request 426, MME 106 may send an authentication request 428 to HSS 116 in conjunction with authenticating UE 102. In some embodiments, MME 106 may send authentication request 428 to HSS 116 during an authentication and key agreement procedure. In various embodiments, authentication request 428 may comprise an Authentication Information Request message. In some embodiments, HSS 116 may send an authentication response 430 to MME 106 in response to receipt of authentication request 428. In various embodiments, authentication response 430 may comprise an Authentication Information Answer message. In some embodiments, information comprised in subscriber profile 117 may be included within authentication response 430. In various such embodiments, that information may include the telephone identification information 118 associated with UE 102. In some embodiments, rather than obtaining telephone identification information 118 via the exchange of authentication request 428 and authentication response 430, MME 106 may obtain telephone identification information 118 from HSS 116 using a procedure specifically dedicated for requesting and obtaining telephone identification information. In various embodiments, for example, MME 106 may send a PSAP callback number request message to HSS 116 and may receive a response message comprising telephone identification information 118 in response to the PSAP callback number request message. The embodiments are not limited in this context.

In some embodiments, following receipt of authentication response 430, MME 106 may send a session creation request 432 in conjunction with a procedure for establishing a default bearer via which UE 102 may communicate with IMS 250. In various embodiments, MME 106 may include telephone identification information 118 within session creation request 432. In some embodiments, session creation request 432 may comprise an emergency indicator to s indicate that session creation request 432 comprises an emergency request. In various embodiments, session creation request 432 may comprise a Create Session Request message. In some embodiments, MME 106 may send session creation request 432 to SGW 108, and SGW 108 may forward session creation request 432 to PGW 210. The embodiments are not limited in this context.

In various embodiments, following receipt of session creation request 432, PGW 210 may send an internet protocol (IP) connectivity request 433 to PCRF 212. In some embodiments, PGW 210 may include telephone identification information 118 within IP connectivity request 433. In various embodiments, PGW 210 may send IP connectivity request 433 to PCRF 212 in conjunction with an IP connectivity access network (IP-CAN) session establishment procedure. In some embodiments, IP connectivity request 433 may comprise a Diameter protocol message, such as a CC-Request message. The embodiments are not limited in this context.

In various embodiments, a default bearer may be established via which UE 102 may communicate with P-CSCF 214 in IMS 250. In some embodiments, the default bearer may be established during the course of an attach procedure or PDN connectivity establishment procedure initiated by UE 102's transmission of emergency PDN connection request 426. In various embodiments, following establishment of the default bearer, UE 102 may send a registration message 434 to P-CSCF 214. In some embodiments, UE 102 may send registration message 434 to P-CSCF 214 in conjunction with an IMS registration procedure. In various embodiments, registration message 434 may comprise a Session Initiation Protocol (SIP) message. In some embodiments, registration message 434 may comprise an SIP REGISTER message. In various embodiments, UE 102 may include an identity parameter 435 within registration message 434. In various embodiments, identity parameter 435 may generally comprise information specifying a public identity associated with UE 102. In various embodiments, identity parameter 435 may comprise an SIP URI associated with UE 102. The embodiments are not limited in this context.

As noted above, in some embodiments, UE 102 may send registration message 434 in conjunction with an IMS registration procedure. In various embodiments, UE 102 may initiate the IMS registration procedure in order to attempt to register with IMS 250. In some embodiments, successfully registering UE 102 with IMS 250 may require the retrieval of information stored at HSS 116, such as information comprised in the subscriber profile 117 associated with UE 102. In various embodiments, due to the absence of an NNI between IMS 250 and IMS 170, IMS 250 may be unable to communicate with HSS 116, and the IMS registration procedure may fail. The embodiments are not limited in this context.

In some embodiments, in response to a determination that the IMS registration procedure has failed, UE 102 may use an IMS session initiation procedure to attempt to establish an unauthenticated IMS emergency session with IMS 250. In various embodiments, in conjunction with the IMS session initiation procedure, UE 102 may send an invitation message 436 to P-CSCF 214. In some embodiments, invitation message 436 may comprise an SIP message. In various embodiments, invitation message 436 may comprise an SIP INVITE message. In some embodiments, UE 102 may include an identity parameter 437 within invitation message 436. In various embodiments, identity parameter 437 may comprise information generally indicating an anonymous identity. In some embodiments, for example, identity parameter 437 may comprise an anonymous user parameter. The embodiments are not limited to this example.

In various embodiments, following receipt of invitation message 436, P-CSCF 214 may communicate with PCRF 212 in order to establish an Rx Diameter session. In some embodiments, P-CSCF 214 may initiate an Rx session establishment procedure in order to establish the Rx Diameter session. In various embodiments, P-CSCF 214 may initiate the Rx session establishment procedure by sending an AA-Request message to PCRF 212. In some embodiments, in conjunction with the establishment of the Rx Diameter session, PCRF 212 may send an Rx session establishment message 438 to P-CSCF 214. In various embodiments, PCRF 212 may include telephone identification information 118 in Rx session establishment message 438. In some embodiments, Rx session establishment message 438 may comprise a Diameter protocol message. In various embodiments, Rx session establishment message 438 may comprise an AA-Answer (AAR) command. The embodiments are not limited in this context.

In some embodiments, following receipt of Rx session establishment message 438, P-CSCF 214 may determine a callback parameter 440 based on telephone identification information 118 comprised in Rx session establishment message 438. In various embodiments, callback parameter 440 may generally comprise information usable by PSAP 224 to place a return call to UE 102. In some embodiments, callback parameter 440 may comprise a telephone number associated with UE 102. In various embodiments, P-CSCF 214 may route UE 102's IME emergency call to PSAP 224 by forwarding invitation message 436 to PSAP 224. In some embodiments, P-CSCF 214 may insert callback parameter 440 into invitation message 436 in conjunction with forwarding invitation message 436 to PSAP 224. In various embodiments, PSAP 224 may use callback parameter 440 to identify a callback number via which it may reach UE 102 if it becomes necessary to do so following completion/termination of the IMS emergency call. The embodiments are not limited in this context.

Figure 5:
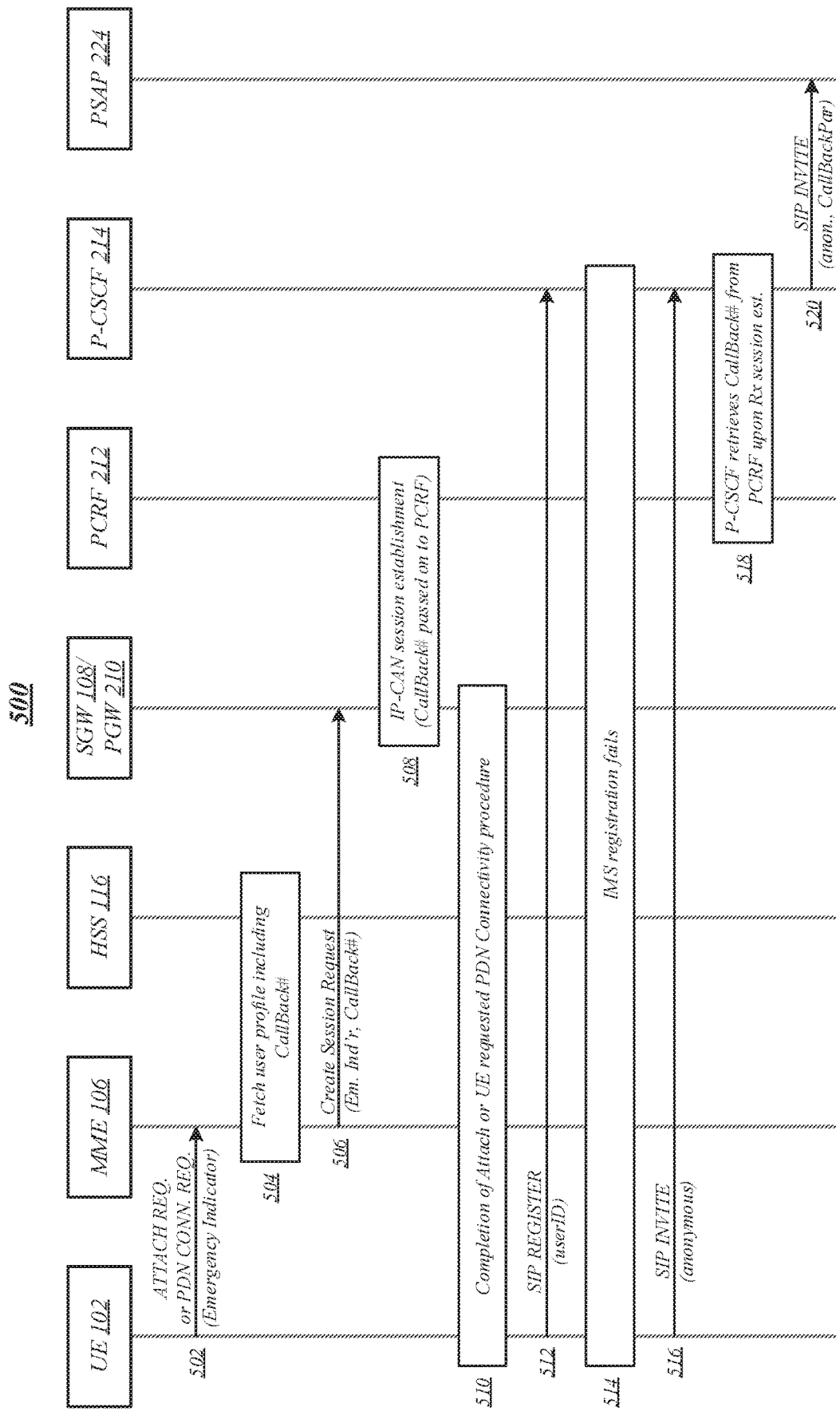
FIG. 5 illustrates an embodiment of a first communications flow.

FIG. 5 illustrates an example of a communications flow 500 that may be representative of the implementation of one or more of the disclosed emergency call routing techniques according to some embodiments. For example, communications flow 500 may be representative of communications that may be performed by various entities in operating environment 400 of FIG. 4 according to various embodiments. As shown in FIG. 5, UE 102 may send an ATTACH REQUEST or a PDN CONNECTIVITY REQUEST to MME 106 at 502 in order to establish a PDN connection for IMS emergency services. In some embodiments, the ATTACH REQUEST or PDN CONNECTIVITY REQUEST may comprise an emergency indicator to indicate that it comprises a request for establishment of a PDN connection for emergency purposes.

At 504, MME 106 may interact with HSS 116 over an S6a interface in order to authenticate UE 102. In various embodiments, MME 106 may fetch information from a subscription profile associated with UE 102 that is stored in HSS 116. In some embodiments, the fetched information may include a PSAP callback number (CallBack #). In various embodiments, the PSAP callback number may comprise a mobile station international subscriber director number (MSISDN) associated with UE 102. In some embodiments, MME 106 may explicitly request that HSS 116 provide the PSAP callback number associated with UE 102. For example, in various embodiments, MME 106 may include—within a message that it sends to HSS 116 via an S6a interface—an indication of a request for the PSAP callback number, and HSS 116 may include the PSAP callback number in a response that it sends to MME 106 via the S6a interface. In some other embodiments, HSS 116 may be preconfigured to provide PSAP callback numbers in response to requests to authenticate UEs roaming in particular PLMNs, such as PLMNs towards which no SIP-level NNI exists from the PLMN of HSS 116. In various embodiments, if the message that UE 102 sends at 502 is a PDN CONNECTIVITY REQUEST, MME 106 may not interact with HSS 116 to authenticate UE 102. However, in some embodiments, MME 106 may already have obtained the PSAP callback number for UE 102 from HSS 116 during an Attach procedure that preceded transmission of the PDN CONNECTIVITY REQUEST. In various other embodiments, MME 106 may interact with HSS 116 according to a new procedure designed specifically for the purpose of requesting PSAP callback numbers when PDN connections for emergency services are requested by inbound roamers. The embodiments are not limited in this context.

At 506, MME 106 may send a Create Session Request towards PGW 210. In some embodiments, the Create Session Request may comprise the PSAP callback number for UE 102. In various embodiments, the Create Session Request may comprise an emergency indicator to indicate that it comprises a request for establishment of a default bearer for emergency purposes. At 508, PGW 210 may establish an IP-CAN session with PCRF 212. In some embodiments, PGW 210 may establish the IP-CAN session with PCRF 212 using one or more messages, procedures, and/or protocols described in 3GPP TS 23.401 and/or 3GPP TS 23.203. In various embodiments, the IP-CAN session may be identified with UE 102's IPv4 address or IPv6 prefix associated with the PDN connection for IMS emergency services. In some embodiments, in conjunction with establishing the IP-CAN session, PGW 210 may pass the PSAP callback number for UE 102 to PCRF 212. At 510, a procedure that UE 102 initiated via its transmission at 502 may be completed. In various embodiments, UE 102 may initiate an Attach procedure at 502 by transmitting an ATTACH REQUEST, and the Attach procedure may be completed at 510. In some embodiments, UE 102 may initiate a PDN connectivity procedure at 502 by transmitting a PDN CONNECTIVITY REQUEST, and the PDN connectivity procedure may be completed at 510. The embodiments are not limited in this context.

At 512, UE 102 may attempt IMS registration for emergency services by sending an SIP REGISTER message to P-CSCF 214. In various embodiments. UE 102 may include a public identity (userID) in the SIP REGISTER message. In some embodiments, userID may comprise an SIP URI of UE 102. At 514, emergency IMS registration of UE 102 may fail due to the absence of an SIP-based NNI between a VPLMN in which UE 102 is roaming and an HPLMN in which HSS 116 is located. For example, in in reference to operating environment 400 of FIG. 4, emergency IMS registration of UE 102 may fail due to the absence of NNI 255. In various embodiments, in order to incite UE 102 to attempt an unauthenticated IMS emergency session, P-CSCF 214 may include an explicit cause in an SIP 4xx failure response message (not pictured) that it may send to UE 102. In some such embodiments, the explicit cause may comprise a "reason phrase" according to Internet Engineering Task Force (IETF) request for consideration (RFC) 3261. In various other embodiments, P-CSCF 214 may use an existing client failure response code to incite UE 102 to attempt an unauthenticated IMS emergency session. In some embodiments, the existing client failure response code may be designated—in the context of IMS emergency registration—as a code to be used to indicate an invitation to proceed with an unauthenticated IMS emergency session. In various such embodiments, the existing client failure response code may comprise a "488 Not Acceptable Here" code.

At 516, UE 102 may send an SIP INVITE message in order to attempt to establish an unauthenticated IMS emergency session. In some embodiments, UE 102 may include an anonymous user parameter in the SIP INVITE message. At 518, P-CSCF 214 may intercept the SIP INVITE message sent at 516 and may contact PCRF 212 in conjunction with the establishment of an Rx session. In various embodiments, despite the failure of IMS registration for emergency services at 514, PCRF 212 may be able to perform session binding based on the UE 102's IP address/prefix. In some embodiments, P-CSCF 214 may obtain an IPv4 address and/or an IPv6 prefix associated with UE 102 from an IP packet that carries the SIP INVITE message sent at 516. In various embodiments, the IPv4 address and/or IPv6 prefix may be comprised among information in a Contact header field of the SIP INVITE request. In some embodiments, P-CSCF 214 may include an IPv4 address associated with UE 102 as a Framed-IP-Address AVP in an initial Diameter protocol AA-Request message that it sends to PCRF 212 in conjunction with the establishment of an Rx session at 518. In various such embodiments, P-CSCF 214 may also include an IP-Domain-Id value associated with the IPv4 address in the initial Diameter protocol AA-Request message. In some embodiments, P-CSCF 214 may include an IPv6 prefix associated with UE 102 as a Framed-Ipv6-Prefix AVP in the initial Diameter protocol AA-Request message. In various embodiments, PCRF 212 may retrieve the PSAP callback number for UE 102 that it received during IP-CAN session establishment at 508 and may return the PSAP callback number to the P-CSCF 214 in a Diameter protocol AA-Answer message that it sends to P-CSCF 214 during Rx session establishment at 518. The embodiments are not limited in this context.

At 520, P-CSCF 214 may forward the SIP INVITE that it received at 516 towards PSAP 224. In some embodiments, P-CSCF 214 may determine a callback parameter (CallBackPar) associated with UE 102 and may include the callback parameter in the SIP INVITE message that it forwards to PSAP 224 at 520. In various embodiments, P-CSCF 214 may derive the callback parameter (CallBackPar) from the PSAP callback number (CallBack #) that it received at 518. In some embodiments, CallBack # may comprise an MSISDN associated with UE 102, and P-CSCF 214 may apply preconfigured rules to translate the MSISDN into a TEL URI format. In various embodiments, following receipt of the SIP INVITE message at 520, PSAP 224 may store the callback parameter associated with UE 102 and communicate with UE 102 via the IMS emergency session. In some embodiments, after termination of the IMS emergency session, the emergency PDN connection may be released. In various embodiments, release of the emergency PDN connection may clear information from the network that is related to the emergency PDN connection. In some embodiments, this information clearance may include clearance from PCRF 212 and P-CSCF 214 of the PSAP callback number (CallBack #) associated with UE 102. In various embodiments, by retrieving the stored callback parameter associated with UE 102, PSAP 224 may be able to identify a callback number via which it may reach UE 102 if it becomes necessary to do so following completion/termination of the IMS emergency call. The embodiments are not limited in this context.

In some embodiments, P-CSCF 214 may be capable of determining ahead of time that the attempted emergency IMS registration initiated at 512 will fail. In various embodiments, for example, P-CSCF 214 may be able to determine that the emergency IMS registration of UE 102 will fail based on a determination that UE 102 is an inbound roamer and that no SIP-based NNI exists between the PLMN of P-CSCF 214 and the HPLMN of UE 102. In some embodiments, rather than allowing the attempted emergency IMS registration of UE 102 to proceed to the point of failure, P-CSCF 214 may skip one or more operations of the emergency IMS registration procedure and respond to the SIP REGISTER message in such a way as to indicate to UE 102 that emergency IMS registration has succeeded.

Figure 6:
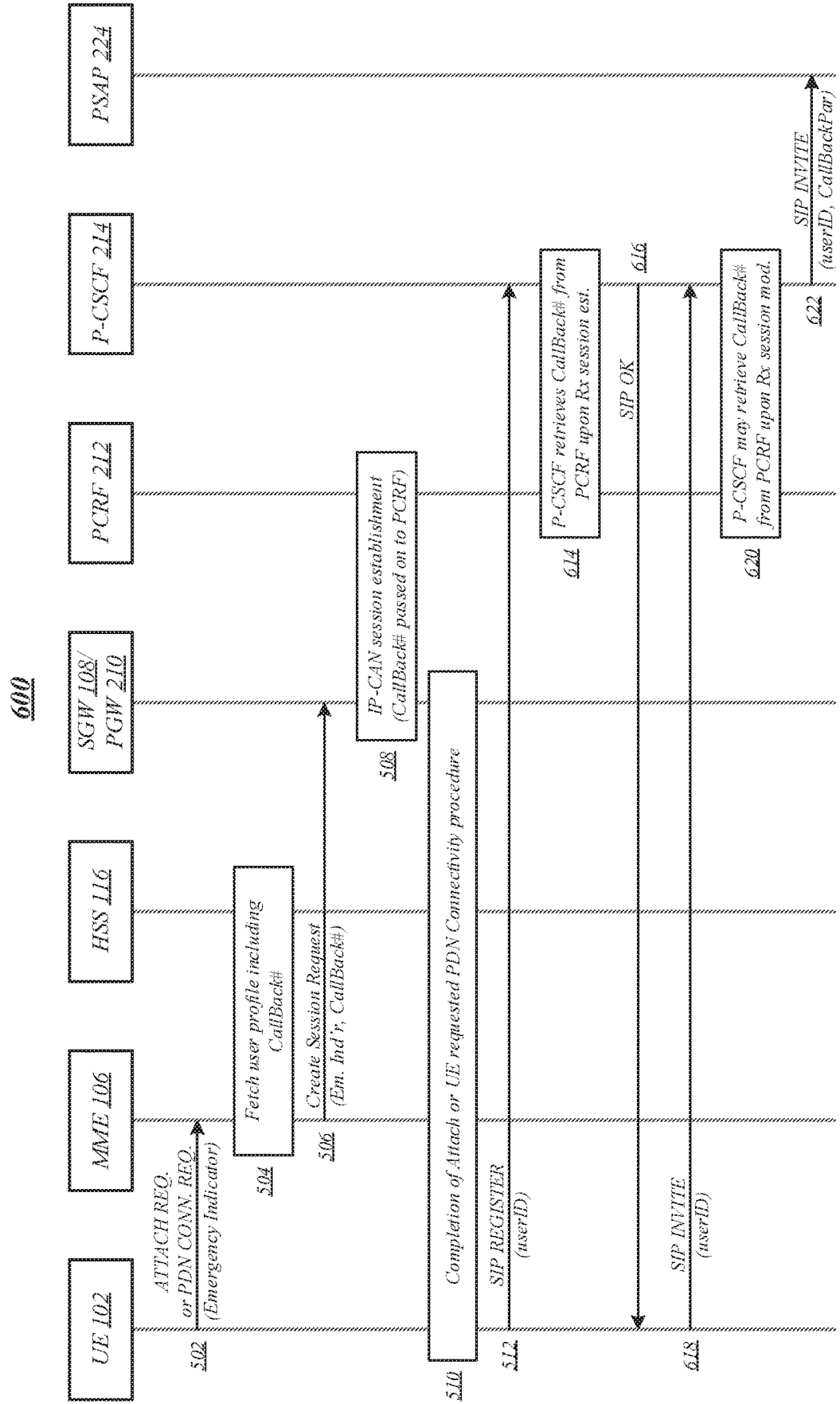
FIG. 6 illustrates an embodiment of a second communications flow.

FIG. 6 illustrates an example of a communications flow 600 that may be representative of various such embodiments. As shown in FIG. 6, communications flow 600 may begin with the same communications and operations as are performed at 502, 504, 506, 508, 510, and 512 in FIG. 5. At 614, P-CSCF 214 may contact PCRF 212 in order to establish an Rx session. In some embodiments, PCRF 212 may be able to perform session binding based on UE 102's IP address/prefix. In various embodiments, P-CSCF 214 may obtain an IPv4 address and/or an IPv6 prefix associated with UE 102 from an IP packet that carries the SIP REGISTER message sent at 512. In some embodiments, the IPv4 address and/or IPv6 prefix may be comprised among information in a Contact header field of the SIP REGISTER request. In various embodiments, P-CSCF 214 may include an IPv4 address associated with UE 102 as a Framed-IP-Address AVP in an initial Diameter protocol AA-Request message that it sends to PCRF 212 in conjunction with the establishment of an Rx session at 614. In some such embodiments, P-CSCF 214 may also include an IP-Domain-Id value associated with the IPv4 address in the initial Diameter protocol AA-Request message. In various embodiments, P-CSCF 214 may include an IPv6 prefix associated with UE 102 as a Framed-Ipv6-Prefix AVP in the initial Diameter protocol AA-Request message. In some embodiments, PCRF 212 may retrieve the PSAP callback number (CallBack #) for LIE 102 that it received during IP-CAN session establishment at 508 and may return the PSAP callback number to P-CSCF 214 in a Diameter protocol AA-Answer message that it sends to P-CSCF 214 during Rx session establishment at 614. The embodiments are not limited in this context.

By analyzing the PSAP callback number received at 614, P-CSCF 214 may determine that UE 102 is an inbound roamer and that no SIP-based NNI exists between the PLMN of P-CSCF 214 and the HPLMN of UE 102. Based on this determination, at 616, P-CSCF 214 may forgo IMS authentication of UE 102 and respond positively to the SIP REGISTER message sent by UE 102 in order to locally acknowledge the IMS emergency registration. In some embodiments, P-CSCF 214 may respond positively to the SIP REGISTER message sent by UE 102 by sending an SIP OK message to UE 102. In various embodiments, P-CSCF 214 may forgo IMS authentication of UE 102 and respond positively to the SIP REGISTER message sent by UE 102 based on an indication received from PCRF 212. For example, in some embodiments, PCRF 212 may include— within an AA-Answer message that it sends to P-CSCF 214—an explicit indication that the emergency PDN connection has been requested by an inbound roamer from an HPLMN towards which no SIP-level NNI exists from the PLMN of P-CSCF 214. The embodiments are not limited in this context.

At 618, UE 102 may send an SIP INVITE message in order to attempt to establish an IMS emergency session. In various embodiments, based on receipt of the SIP OK message at 616, UE 102 may determine that emergency IMS registration has succeeded, and may include the same public identity (userID) within the SIP INVITE message that it included within the SIP REGISTER message sent at 512. In some embodiments, this public identity may comprise an SIP URI associated with UE 102. At 620, P-CSCF 214 may intercept the SIP INVITE message sent at 618 and may contact PCRF 212 in order to modify the Rx session established at 614. In various embodiments, PCRF 212 may return the PSAP callback number (CallBack #) to UE 102 a second time in conjunction with Rx session modification. In some embodiments, for example, PCRF 212 may include the PSAP callback number in an AA-Answer message that it sends to P-CSCF 214 in conjunction with a procedure for modifying the Rx session. The embodiments are not limited in this context.

At 622, P-CSCF 214 may forward the SIP INVITE that it received at 618 towards PSAP 224. In various embodiments, P-CSCF 214 may determine a callback parameter (CallBackPar) associated with UE 102 and may include the callback parameter in the SIP INVITE message that it forwards to PSAP 224 at 622. In some embodiments, P-CSCF 214 may derive the callback parameter (CallBackPar) from the PSAP callback number (CallBack #) that it received at 614 and/or 620. In various embodiments, CallBack # may comprise an MSISDN associated with UE 102, and P-CSCF 214 may apply preconfigured rules to translate the MSISDN into a TEL URI format. In some embodiments, following receipt of the SIP INVITE message at 622, PSAP 224 may store the callback parameter associated with UE 102 and communicate with UE 102 via the IMS emergency session. In various embodiments, after termination of the IMS emergency session, the emergency PDN connection may be released. In some embodiments, release of the emergency PDN connection may clear information from the network that is related to the emergency PDN connection. In various embodiments, this information clearance may include clearance from PCRF 212 and P-CSCF 214 of the PSAP callback number (CallBack #) associated with UE 102. In some embodiments, by retrieving the stored callback parameter associated with UE 102, PSAP 224 may be able to identify a callback number via which it may reach UE 102 if it becomes necessary to do so following completion/ termination of the IMS emergency call. The embodiments are not limited in this context.

It is worthy of note that in various embodiments, one or more of the disclosed techniques may be implemented in conjunction with IMS emergency calls that are initiated via WLAN/S2b interface access. In some such embodiments, one or more of the previously discussed operations of MME 106 may be performed by an evolved packet data gateway (ePDG) of the PLMN in which UE 102 is roaming. In various embodiments, the ePDG may obtain the PSAP callback number (CallBack #) associated with UE 102 by interacting with one or more authentication, authorization, and accounting (AAA) servers/nodes within the HPLMN of UE 102. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
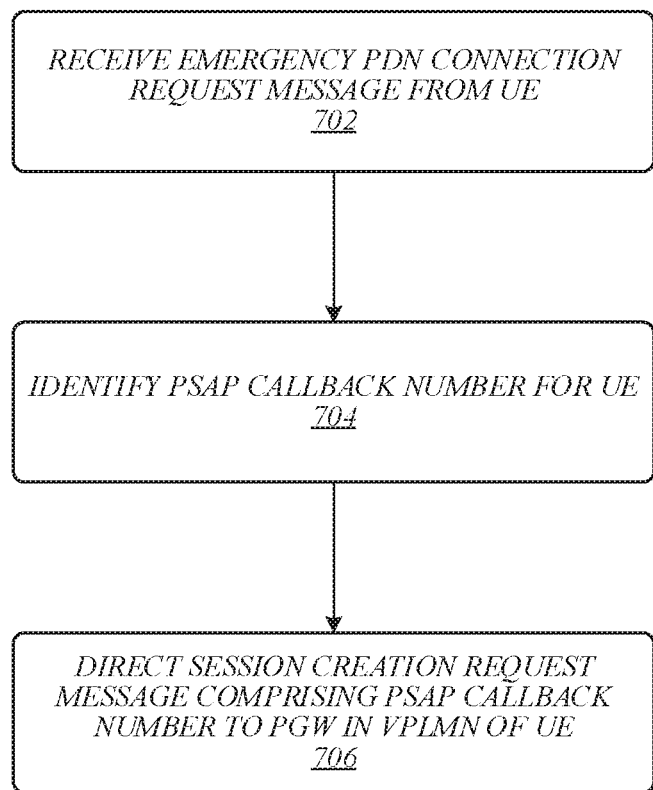
FIG. 7 illustrates an embodiment of a first logic flow.

FIG. 7 illustrates an embodiment of a logic flow 700 that may be representative of the implementation of one or more of the disclosed techniques according to some embodiments. For example, logic flow 700 may be representative of operations that may be performed in operating environment 400 of FIG. 4 by MME 106 in conjunction with the implementation of one or more of the disclosed techniques according to various embodiments. As shown in FIG. 7, an emergency PDN connection request may be received from a UE at 702. For example, in operating environment 400 of FIG. 4, MME 106 may receive emergency PDN connection request 426 from UE 102. At 704, a PSAP callback number for the UE may be identified. For example, in operating environment 400 of FIG. 4, MME 106 may identify a PSAP callback number for UE 102 based on information comprised in authentication response 430. At 706, a session creation request message comprising the PSAP callback number may be directed to a PGW in a VPLMN of the UE. For example, in operating environment 400 of FIG. 4, MME 106 may direct session creation request 432 to the PGW 210 in the VPLMN 140 of UE 102, and session creation request 432 may contain telephone identification information 118 that comprises the PSAP callback number for UE 102. The embodiments are not limited to these examples.

Figure 8:
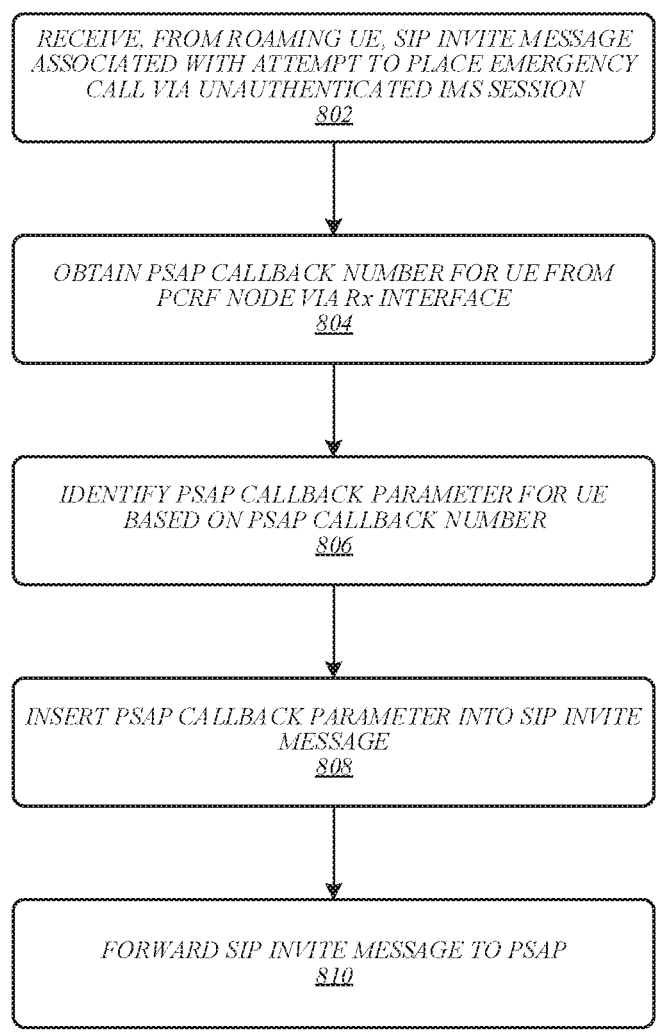
FIG. 8 illustrates an embodiment of a second logic flow.

FIG. 8 illustrates an embodiment of a logic flow 800 that may be representative of the implementation of one or more of the disclosed techniques according to some embodiments. For example, logic flow 800 may be representative of operations that may be performed in operating environment 400 of FIG. 4 by P-CSCF 214 in conjunction with the implementation of one or more of the disclosed techniques according to various embodiments. As shown in FIG. 8, an SIP INVITE message may be received from a roaming UE at 802, and the SIP INVITE message may be associated with an attempt to place an emergency call via an unauthenticated IMS session. For example, in operating environment 400 of FIG. 4, P-CSCF 214 may receive invitation message 436 from roaming UE 102, and invitation message 436 may comprise an SIP INVITE message associated with an attempt on the part of UE 102 to place an emergency call via an unauthenticated IMS session. At 804, a PSAP callback number for the UE may be obtained from a PCRF node via an Rx interface. For example, in operating environment 400 of FIG. 4, P-CSCF 214 may obtain telephone identification information 118 from PCRF 212 via an Rx interface, and telephone identification information 118 may comprise a PSAP callback number for UE 102.

At 806, a PSAP callback parameter for the UE may be identified based on the PSAP callback number. For example, in operating environment 400 of FIG. 4, P-CSCF 214 may identify callback parameter 440 based on a PSAP callback number comprised in telephone identification information 118 received from PCRF 212, and callback parameter 440 may comprise a PSAP callback parameter for UE 102. At 808, the PSAP callback parameter may be inserted into the SIP INVITE message. For example, in operating environment 400 of FIG. 4, P-CSCF 214 may insert callback parameter 440 into the invitation message 436 received from UE 102, invitation message 436 may comprise an SIP INVITE message, and callback parameter 440 may comprise a PSAP callback parameter for UE 102. At 810, the SIP INVITE message may be forwarded to a PSAP. For example, in operating environment 400 of FIG. 4, P-CSCF 214 may forward invitation message 436 to PSAP 224, and invitation message 436 may comprise an SIP INVITE message. The embodiments are not limited to these examples.

Figure 9:
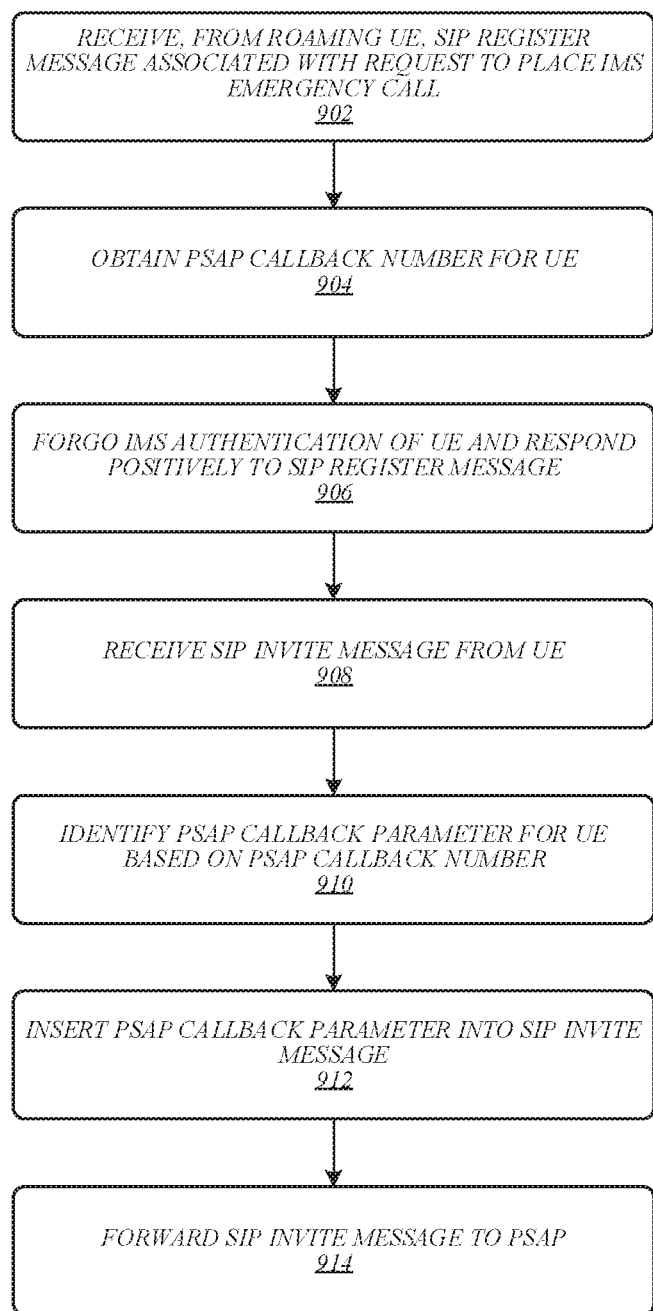
FIG. 9 illustrates an embodiment of a third logic flow.

FIG. 9 illustrates an embodiment of a logic flow 900 that may be representative of the implementation of one or more of the disclosed techniques according to some embodiments. For example, logic flow 900 may be representative of operations that may be performed in operating environment 400 of FIG. 4 by P-CSCF 214 in conjunction with the implementation of one or more of the disclosed techniques according to various embodiments. As shown in FIG. 9, an SIP REGISTER message may be received from a roaming UE at 902, and the SIP REGISTER message may be associated with a request to place an IMS emergency call. For example, in operating environment 400 of FIG. 4, P-CSCF 214 may receive registration message 434 from roaming UE 102, and registration message 434 may comprise an SIP REGISTER message associated with a request on the pail of UE 102 to place an IMS emergency call.

At 904, a PSAP callback number for the UE may be obtained. For example, in operating environment 400 of FIG. 4, P-CSCF 214 may obtain telephone identification information 118 from PCRF 212, and telephone identification information 118 may comprise a PSAP callback number for UE 102. At 906, IMS authentication of the UE may be forgone and the SIP REGISTER message may be responded to positively. For example, in operating environment 400 of FIG. 4, P-CSCF 214 may forgo IMS authentication of UE 102 and may send an SIP OK message to UE 102. At 908, an SIP INVITE message may be received from the UE. For example, in operating environment 400 of FIG. 4, P-CSCF 214 may receive invitation message 436 from roaming UE 102, and invitation message 436 may comprise an SIP INVITE message.

At 910, a PSAP callback parameter for the UE may be identified based on the PSAP callback number. For example, in operating environment 400 of FIG. 4, P-CSCF 214 may identify callback parameter 440 based on a PSAP callback number comprised in telephone identification information 118 received from PCRF 212, and callback parameter 440 may comprise a PSAP callback parameter for UE 102. At 912, the PSAP callback parameter may be inserted into the SIP INVITE message. For example, in operating environment 400 of FIG. 4, P-CSCF 214 may insert callback parameter 440 into the invitation message 436 received from UE 102, invitation message 436 may comprise an SIP INVITE message, and callback parameter 440 may comprise a PSAP callback parameter for UE 102. At 914, the SIP INVITE message may be forwarded to a PSAP. For example, in operating environment 400 of FIG. 4. P-CSCF 214 may forward invitation message 436 to PSAP 224, and invitation message 436 may comprise an SIP INVITE message. The embodiments are not limited to these examples.

Figure 10A:
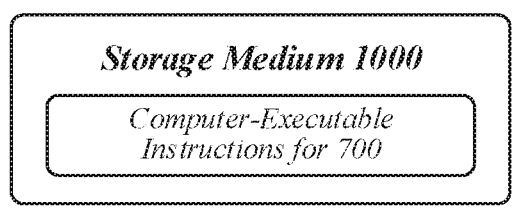
FIG. 10A illustrates an embodiment of a first storage medium.

FIG. 10A illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10B:
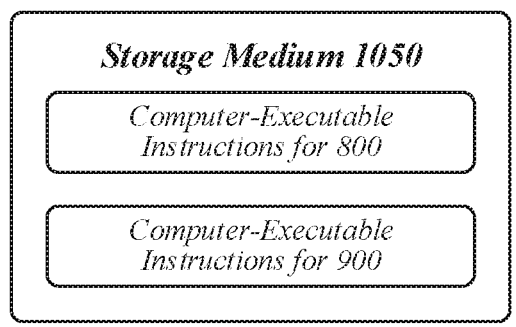
FIG. 10B illustrates an embodiment of a second storage medium.

FIG. 10B illustrates an embodiment of a storage medium 1050. Storage medium 1050 may comprise any non-transitory computer-readable storage medium or machine-readable storage medium, such as an optical, magnetic or semiconductor storage medium. In various embodiments, storage medium 1050 may comprise an article of manufacture. In some embodiments, storage medium 1050 may store computer-executable instructions, such as computer-executable instructions to implement one or both of logic flow 800 of FIG. 8 and logic flow 900 of FIG. 9. Examples of computer-readable storage medium or machine-readable storage medium and of computer-executable instructions may include—without limitation—any of the respective examples mentioned above in reference to storage medium 1000 of FIG. 10A. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 11:
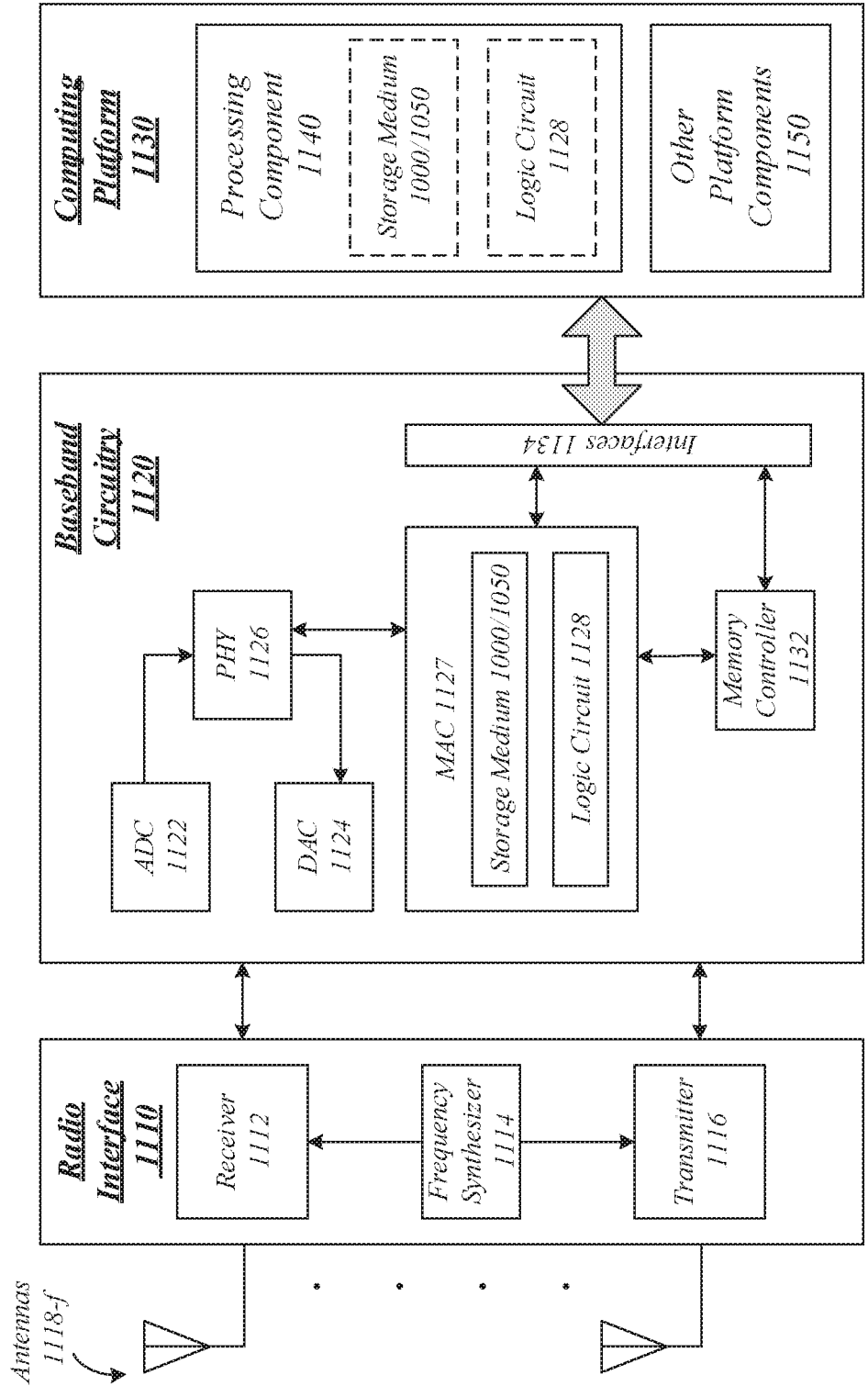
FIG. 11 illustrates an embodiment of a device.

FIG. 11 illustrates an embodiment of a communications device 1100 that may implement one or more of MME 106, HSS 116, SGW 108, PGW 210, PCRF 212, P-CSCF 214, logic flow 700, logic flow 800, logic flow 900, storage medium 1000, and storage medium 1050. In various embodiments, device 1100 may comprise a logic circuit 1128. The logic circuit 1128 may include physical circuits to perform operations described for one or more of MME 106, HSS 116, SGW 108, PGW 210, PCRF 212, P-CSCF 214, logic flow 700, logic flow 800, and logic flow 900, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of MME 106, HSS 116, SGW 108, PGW 210, PCRF 212, P-CSCF 214, logic flow 700, logic flow 800, logic flow 900, storage medium 1000, storage medium 1050, and logic circuit 1128 in a single computing entity, such as entirely within a single device. Alternatively, the device 1100 may distribute portions of the structure and/or operations for one or more of MME 106, HSS 116, SGW 108, PGW 210, PCRF 212, P-CSCF 214, logic flow 700, logic flow 800, logic flow 900, storage medium 1000, storage medium 1050, and logic circuit 1128 across m multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1110 may include, for example, a receiver 1112, frequency synthesizer 1114, and/or a transmitter 1116. Radio interface 1110 may include bias controls, a crystal oscillator and/or one or more antennas 1118-$f$. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, a mixer for down-converting received RF signals, an analog-to-digital converter 1122 for converting analog signals to digital form, a digital-to-analog converter 1124 for converting digital signals to analog form, and a mixer for up-converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of MME 106, HSS 116, SGW 108, PGW 210, PCRF 212, P-CSCF 214, logic flow 700, logic flow 800, logic flow 900, storage medium 1000, storage medium 1050, and logic circuit 1128 using the processing component 1140. The processing s component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (RDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONGS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
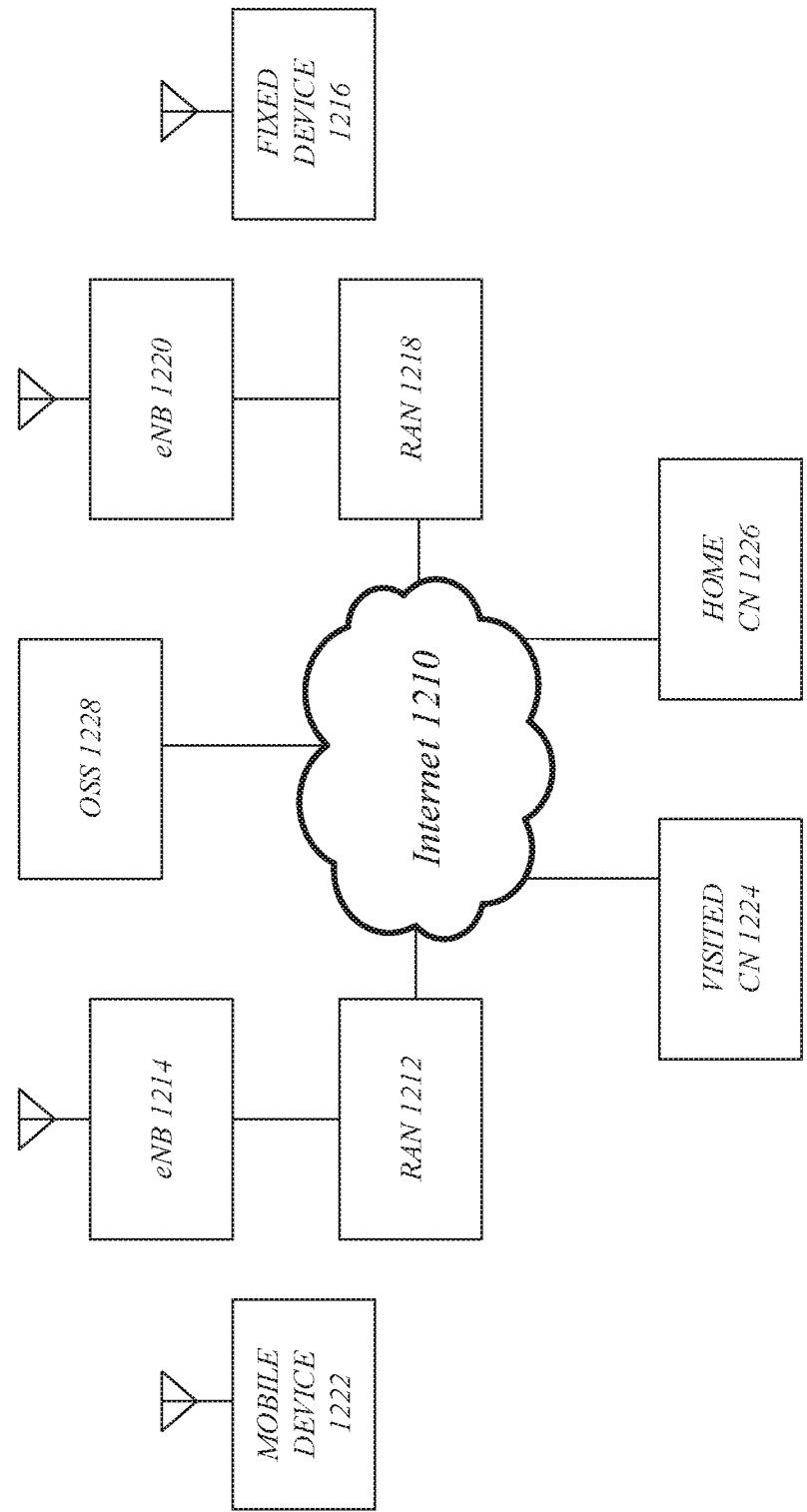
FIG. 12 illustrates an embodiment of a wireless network.

FIG. 12 illustrates an embodiment of a broadband wireless access system 1200. As shown in FIG. 12, broadband wireless access system 1200 may be an internet protocol (IP) type network comprising an internet 1210 type network or the like that is capable of supporting mobile wireless access and/or fixed wireless access to internet 1210. In one or more embodiments, broadband wireless access system 1200 may comprise any type of orthogonal frequency division multiple access (OFDMA)-based or single-carrier frequency division multiple access (SC-TDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1200, radio access networks (RANs) 1212 and 1218 are capable of coupling with evolved node Bs (eNBs) 1214 and 1220, respectively, to provide wireless communication between one or more fixed devices 1216 and internet 1210 and/or between or one or more mobile devices 1222 and Internet 1210. One example of a fixed device 1216 and a mobile device 1222 is device 1100 of FIG. 11, with the fixed device 1216 comprising a stationary version of device 1100 and the mobile device 1222 comprising a mobile version of device 1100. RANs 1212 and 1218 may implement profiles that are capable of defining the mapping of network functions to one or more physical entities on broadband wireless access system 1200. eNBs 1214 and 1220 may comprise radio equipment to provide RF communication with fixed device 1216 and/or mobile device 1222, such as described with reference to device 1100, and may comprise, for example, the PRY and MAC layer equipment in compliance with a 3GPP LTE Specification or an IEEE 802.16 Standard. eNBs 1214 and 1220 may further comprise an IP backplane to couple to Internet 1210 via RANs 1212 and 1218, respectively, although the scope of the claimed subject matter is not limited in these respects.

Broadband wireless access system 1200 may further comprise a visited core network (CN) 1224 and/or a home CN 1226, each of which may be capable of providing one or more network functions including but not limited to proxy and/or relay type functions, for example authentication, authorization and accounting (AAA) functions, dynamic host configuration protocol (MCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CN 1224 and/or home CN 1226, and the scope of the claimed subject matter is not limited in these respects. Visited CN 1224 may be referred to as a visited CN in the case where visited CN 1224 is not part of the regular service provider of fixed device 1216 or mobile device 1222, for example where fixed device 1216 or mobile device 1222 is roaming away from its respective home CN 1226, or where broadband wireless access system 1200 is part of the regular service provider of fixed device 1216 or mobile device 1222 but where broadband wireless access system 1200 may be in another location or state that is not the main or home location of fixed device 1216 or mobile device 1222. The embodiments are not limited in this context.

Fixed device 1216 may be located anywhere within range of one or both of eNBs 1214 and 1220, such as in or near a home or business to provide home or business customer broadband access to Internet 1210 via eNBs 1214 and 1220 and RANs 1212 and 1218, respectively, and home CN 1226. It is worthy of note that although fixed device 1216 is generally disposed in a stationary location, it may be moved to different locations as needed. Mobile device 1222 may be utilized at one or more locations if mobile device 1222 is within range of one or both of eNBs 1214 and 1220, for example. In accordance with one or more embodiments, operation support system (OSS) 1228 may be part of broadband wireless access system 1200 to provide management functions for broadband wireless access system 1200 and to provide interfaces between functional entities of broadband wireless access system 1200. Broadband wireless access system 1200 of FIG. 12 is merely one type of wireless network showing a certain number of the components of broadband wireless access system 1200, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a m tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a method for network communication, comprising receiving, at a proxy call session control function (P-CSCF) node, a session initiation protocol (SIP) INVITE message from roaming user equipment (UE), the SIP INVITE message associated with an attempt to place an emergency call via an unauthenticated interact protocol multimedia subsystem (IMS) session, obtaining a public safety answering point (PSAP) callback number for the UE from a policy and charging rules function (PCRF) node via an Rx interface, identifying a PSAP callback parameter for the UE based on the PSAP callback number, inserting the PSAP callback parameter into the SIP INVITE message, and forwarding the SIP INVITE message to a PSAP.

Example 2 is the method of Example 1, the SIP INVITE message comprising an anonymous user parameter.

Example 3 is the method of any of Examples 1 to 2, comprising performing an Rx session establishment procedure to establish an Rx session with the PCRF node, and receiving the PSAP callback number during the Rx session establishment procedure.

Example 4 is the method of Example 3, comprising sending a Diameter protocol AA-Request message to the PCRF node to initiate the Rx session establishment procedure, and m receiving a Diameter protocol AA-Answer message from the PCRF node, the Diameter protocol AA-Answer message comprising the PSAP callback number for the UE.

Example 5 is the method of any of Examples 1 to 4, the PSAP callback number comprising a mobile station international subscriber directory number (MSISDN) associated with the UE.

Example 6 is the method of any of Examples 1 to 5, comprising triggering the attempt to place the emergency call via the unauthenticated IMS session in response to a determination that an IMS registration of the UE has failed.

Example 7 is the method of Example 6, comprising sending an SIP 4xx failure response message to the UE to trigger the attempt to place the emergency call via the unauthenticated IMS session in response to the determination that the IMS registration of the UE has failed.

Example 8 is the method of Example 7, comprising including an explicit cause in the SIP 4xx failure response message to trigger the attempt to place the emergency call via the unauthenticated IMS session.

Example 9 is the method of Example 8, the explicit cause comprising an Internet Engineering Task Force (IETF) request for consideration (RFC) 3261 reason phrase.

Example 10 is the method of Example 7, comprising including an SIP 4xx failure response code in the SIP 4xx failure response message to trigger the attempt to place the emergency call via the unauthenticated IMS session.

Example 11 is the method of Example 10, the SIP 4xx failure response code comprising a 488 Not Acceptable Here code.

Example 12 is an apparatus, comprising at least one memory, and logic, at least a portion of which is implemented in circuitry coupled to the at least one memory, the logic to perform a method according to any of Examples 1 to 11.

Example 13 is at least one computer-readable storage medium comprising a set of instructions that, in response to being executed on a computing device, cause the computing device to perform a method according to any of Examples 1 to 11.

Example 14 is an apparatus, comprising means for performing a method according to any of Examples 1 to 11.

Example 15 is a method, comprising receiving, at a proxy call session control function (P-CSCF) node, a session initiation protocol (SIP) REGISTER message from roaming user equipment (UE), the SIP REGISTER message associated with a request to place an internet protocol multimedia subsystem (IMS) emergency call, obtaining a public safety answering point (PSAP) callback number for the UE, forgoing IMS registration of the UE and sending an SIP OK message to the UE, receiving an SIP INVITE message from the UE, identifying a PSAP callback parameter for the UE based on the PSAP callback number, inserting the PSAP callback parameter into the SIP INVITE message, and forwarding the SIP INVITE message to a PSAP.

Example 16 is the method of Example 15, the SIP REGISTER message and the SIP INVITE message both comprising a public user identifier parameter associated with the UE.

Example 17 is the method of any of Examples 15 to 16, comprising obtaining the PSAP callback number from a policy and charging rules function (PCRF) node via an Rx interface.

Example 18 is the method of Example 17, comprising performing an Rx session establishment procedure to establish an Rx session with the PCRF node, and receiving the PSAP callback number during the Rx session establishment procedure.

Example 19 is the method of Example 18, comprising sending a Diameter protocol AA-Request message to the PCRF node to initiate the Rx session establishment procedure, and receiving a Diameter protocol AA-Answer message from the PCRF node, the Diameter protocol AA-Answer message comprising the PSAP callback number for the UE.

Example 20 is the method of any of Examples 18 to 19, comprising determining to forgo the IMS registration of the UE and send the SIP OK message to the UE based on an indicator received from the PCRF node during the Rx session establishment procedure.

Example 21 is the method of any of Examples 15 to 19, comprising determining to forgo the IMS registration of the UE and send the SIP OK message to the UE in response to a determination that no SIP-level network-to-network (NNI) interface provides the P-CSCF node with connectivity to a home public land mobile network (HPLMN) of the UE.

Example 22 is the method of any of Examples 15 to 21, the PSAP callback number comprising a mobile station international subscriber directory number (MSISDN) associated with the UE.

Example 23 is the method of Example 22, comprising determining that no SIP-level network-to-network (NNI) interface provides the P-CSCF node with connectivity to a home public land mobile network (HPLMN) of the LIE based on analysis of the PSAP callback number associated with the UE.

Example 24 is the method of any of Examples 15 to 23, comprising performing an Rx session modification procedure in response to receipt of the SIP INVITE message from the UE.

Example 25 is the method of Example 24, comprising receiving a Diameter protocol AA-Answer message from the PCRF node during the Rx session modification procedure, the Diameter protocol AA-Answer message comprising the PSAP callback number for the UE.

Example 26 is an apparatus, comprising at least one memory, and logic, at least a portion of which is implemented in circuitry coupled to the at least one memory, the logic to perform a method according to any of Examples 15 to 25.

Example 27 is at least one computer-readable storage medium comprising a set of instructions that, in response to being executed on a computing device, cause the computing device to perform a method according to any of Examples 15 to 25.

Example 28 is an apparatus, comprising means for performing a method according to any of Examples 15 to 25.

Example 29 is a method, comprising receiving, at a mobility management entity (MME), an emergency packet data network (PDN) connection request message from user equipment WE), identifying a public safety answering point (PSAP) callback number for the UE, and directing a session creation request message to a PDN gateway (PGW) in a visited public land mobile network (VPLMN) of the UE, the session creation request message comprising the PSAP callback number for the UE.

Example 30 is the method of Example 29, the session creation request message comprising an emergency indicator to indicate that the session creation request message comprises an emergency request.

Example 31 is the method of any of Examples 29 to 30, comprising obtaining the PSAP callback number from a home subscriber services (HSS) node of a home public land mobile network (HPLMN) of the UE.

Example 32 is the method of Example 31, comprising obtaining the PSAP callback number from the HSS node via an S6a interface.

Example 33 is the method of any of Examples 31 to 32, the emergency PDN connection request message comprising an S1 ATTACH REQUEST message.

Example 34 is the method of Example 33, comprising sending an authentication request message to the HSS node, and receiving an authentication response message comprising the PSAP callback number in response to the authentication request message.

Example 35 is the method of any of Examples 31 to 32, the emergency PDN connection request message comprising an S1 PDN CONNECTIVITY REQUEST message.

Example 36 is the method of Example 35, comprising sending a PSAP callback number request message to the HSS node, and receiving a response message comprising the PSAP callback number in response to the PSAP callback number request message.

Example 37 is the method of any of Examples 35 to 36, the PSAP callback number obtained from the HSS node prior to receipt of the emergency PDN connection request message.

Example 38 is the method of any of Examples 29 to 37, the session creation request message comprising a Create Session Request message.

Example 39 is the method of any of Examples 29 to 38, the PSAP callback number comprising a mobile station international subscriber directory number (MSISDN) associated with the UE.

Example 40 is an apparatus, comprising at least one memory, and logic, at least a portion of which is implemented in circuitry coupled to the at least one memory, the logic to perform a method according to any of Examples 29 to 39.

Example 41 is at least one computer-readable storage medium comprising a set of instructions that, in response to being executed on a computing device, cause the computing device to perform a method according to any of Examples 29 to 39.

Example 42 is an apparatus, comprising means for performing a method according to any of Examples 29 to 39.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus, comprising:
    processing circuitry; and
    non-transitory computer-readable storage media to store instructions that, when executed by the processing circuitry, cause a proxy call session control function (P-CSCF) of an internet protocol multimedia subsystem (IMS) of a public land mobile network (PLMN) to:
        determine a callback parameter for user equipment (UE) roaming within the PLMN based on a mobile station international subscriber directory number

(MSISDN) comprised in a message received from a policy and charging rules function (PCRF) node during an Rx session establishment procedure;

insert the callback parameter into a received session initiation protocol (SIP) INVITE message associated with an attempt on part of the UE to place an emergency call via an unauthenticated IMS session, the received SIP INVITE message to comprise an anonymous user parameter; and forward the SIP INVITE message to a public safety answering point (PSAP).

2. The apparatus of claim 1, the callback parameter to comprise a telephone uniform resource identifier (TEL URI).

3. The apparatus of claim 1, the non-transitory computer-readable storage media to store instructions that, when executed by the processing circuitry, cause the P-CSCF to initiate the Rx session establishment procedure based on receipt of an SIP REGISTER message from the UE.

4. The apparatus of claim 3, the non-transitory computer-readable storage media to store instructions that, when executed by the processing circuitry, cause the P-CSCF to determine, based on the SIP REGISTER message, that no network-to-network interface (NNI) exists between the IMS of the PLMN and an IMS of a home public land mobile network (HPLMN) of the UE.

5. The apparatus of claim 3, the SIP REGISTER message to comprise an SIP uniform resource identifier (SIP URI) of the UE.

6. The apparatus of claim 1, the non-transitory computer-readable storage media to store instructions that, when executed by the processing circuitry, cause the P-CSCF to initiate the Rx session establishment procedure by sending an AA-Request command to the PCRF node via an Rx interface.

7. The apparatus of claim 6, the AA-Request command to comprise an indication of an internet protocol version 4 (IPv4) address of the UE.

8. The apparatus of claim 7, the AA-Request command to comprise a Framed-IP-Address attribute-value pair (AVP) indicating the IPv4 address of the UE.

9. The apparatus of claim 8, the AA-Request command to comprise an IP-Domain-Id value associated with the IPv4 address of the UE.

10. The apparatus of claim 6, the AA-Request command to comprise an indication of an internet protocol version 6 (IPv6) prefix associated with the UE.

11. The apparatus of claim 10, the AA-Request command to comprise a Framed-Ipv6-Prefix attribute-value pair (AVP) indicating the IPv6 prefix associated with the UE.

12. The apparatus of claim 6, the message received from the PCRF node to comprise an AA-Answer command received via the Rx interface.

13. Non-transitory computer-readable storage media having stored thereon instructions that, in response to being executed by processing circuitry of a computing device, cause a proxy call session control function (P-CSCF) of an internet protocol multimedia subsystem (IMS) of a public land mobile network (PLMN) to:

determine a callback parameter for user equipment (UE) roaming within the PLMN based on a callback number comprised in a message received from a policy and charging rules function (PCRF) node via an Rx interface;

insert the callback parameter into a received session initiation protocol (SIP) INVITE message comprising an anonymous user parameter indicating an attempt by the UE to place an emergency call via an unauthenticated IMS session; and forward the SIP INVITE message to a public safety answering point (PSAP) of the PLMN.

14. The non-transitory computer-readable storage media of claim 13, the callback number to comprise a mobile station international subscriber directory number (MSISDN) associated with the UE.

15. The non-transitory computer-readable storage media of claim 13, the callback parameter to comprise a telephone uniform resource identifier (TEL URI).

16. The non-transitory computer-readable storage media of claim 13, the message received from the PCRF node to comprise an AA-Answer command receiving during an Rx session establishment procedure.

17. The non-transitory computer-readable storage media of claim 16, having stored thereon instructions that, in response to being executed by processing circuitry of the computing device, cause the P-CSCF to initiate the Rx session establishment procedure by sending an AA-Request command to the PCRF node via the Rx interface.

18. The non-transitory computer-readable storage media of claim 17, the AA-Request command to comprise an indication of an internet protocol version 4 (IPv4) address of the UE.

19. The non-transitory computer-readable storage media of claim 18, the AA-Request command to comprise a Framed-IP-Address attribute-value pair (AVP) indicating the IPv4 address of the UE.

20. The non-transitory computer-readable storage media of claim 17, the AA-Request command to comprise an indication of an internet protocol version 6 (IPv6) prefix associated with the UE.

21. The non-transitory computer-readable storage media of claim 20, the AA-Request command to comprise a Framed-Ipv6-Prefix attribute-value pair (AVP) indicating the IPv6 prefix associated with the UE.

22. The non-transitory computer-readable storage media of claim 16, having stored thereon instructions that, in response to being executed by processing circuitry of the computing device, cause the P-CSCF to initiate the Rx session establishment procedure based on receipt of an SIP REGISTER message from the UE.

23. The non-transitory computer-readable storage media of claim 22, having stored thereon instructions that, in response to being executed by processing circuitry of the computing device, cause the P-CSCF to determine, based on the SIP REGISTER message, that no network-to-network interface (NNI) exists between the IMS of the PLMN and an IMS of a home public land mobile network (HPLMN) of the UE.

24. The non-transitory computer-readable storage media of claim 23, the SIP REGISTER message to comprise an SIP uniform resource identifier (SIP URI) of the UE.

* * * * *